United States Patent
Herfurth

(10) Patent No.: US 10,452,092 B2
(45) Date of Patent: Oct. 22, 2019

(54) SUPPLY CIRCUIT

(71) Applicant: Infineon Technologies AG, Neubiberg (DE)

(72) Inventor: Kirk Herfurth, Munich (DE)

(73) Assignee: Infineon Technologies AG, Neubiberg (DE)

( * ) Notice: Subject to any disclaimer, the term of this patent is extended or adjusted under 35 U.S.C. 154(b) by 810 days.

(21) Appl. No.: 14/969,761

(22) Filed: Dec. 15, 2015

(65) Prior Publication Data

US 2016/0179123 A1    Jun. 23, 2016

(30) Foreign Application Priority Data

Dec. 19, 2014 (DE) .......................... 10 2014 119 199

(51) Int. Cl.
*G05F 3/26* (2006.01)
*H02M 1/32* (2007.01)

(52) U.S. Cl.
CPC .............. *G05F 3/26* (2013.01); *H02M 1/32* (2013.01)

(58) Field of Classification Search
CPC ................................... G05F 3/26; H02M 1/32
USPC .................................................. 361/18, 93.9
See application file for complete search history.

(56) References Cited

U.S. PATENT DOCUMENTS 6,995,963 B2 * 2/2006 Fadell ..................... G06F 1/266
361/18

FOREIGN PATENT DOCUMENTS

DE    10 2009 047 099    5/2011
DE    10 2013 101 050    8/2014

OTHER PUBLICATIONS

Office Action dated Mar. 20, 2017 for German Patent Application No. 10 2014 119 199.4.

* cited by examiner

*Primary Examiner* — Dharti H Patel
(74) *Attorney, Agent, or Firm* — Schiff Hardin LLP

(57) ABSTRACT

A supply circuit is provided including a supply generation circuit coupled to a supply terminal. A voltage deviation detection circuit is adapted to detect a voltage deviation in an internal supply voltage. A current limiter arrangement is adapted to limit a current through the supply generation circuit to a predefined value.

26 Claims, 3 Drawing Sheets

SUPPLY CIRCUIT

TECHNICAL FIELD

The present application relates to supply circuits for supplying a voltage and/or a current and to associated devices and methods.

BACKGROUND

Electronic circuits, for example integrated chips, often generate one or more internal supply voltages based on an external supply voltage. For example, for generating one or more internal supply voltages one or more DC/DC converters may be used. A part of the circuit or chip supplied by such a voltage converter or other internal power supply is also referred to as a voltage domain. An internal supply voltage of such a voltage domain may be monitored for example to detect an undervoltage, i.e. the supply voltage being below a predetermined threshold voltage. In such a case, the circuit may be brought to a specific state in some cases, also referred to as reset state or error state (referred to simply as reset state in the following).

In some cases it is desirable to signal the presence of this reset state to other entities, for example to a system coupled with the electronic circuit. This may be of particular interest in cases where the system is on a higher infrastructure level than the electronic circuit. For example in some automotive applications, for such signaling a current interface may be used, and a predefined current level may be used to signal a reset state or an error state e.g. to an ECU as the higher level entity or system.

However, in some cases it may not be possible to provide the predefined current in the reset state in conventional applications. For example, when an undervoltage occurs due to a short circuit, a current caused by the short circuit may increase a current above the predefined current level.

It is therefore an object to provide possibilities for maintaining a desired current level, for example a predefined reset level, in such an error case.

It is a further object to provide possibilities for signaling e.g. an error, fault or failure to an entity coupled to or in communication with the electronic circuit, such that the coupled entity can be reliably informed about error within the electronic circuit.

SUMMARY

In an aspect, a circuit as defined in claim 1 is provided. In a further aspect, a device as defined in claim 13 is provided. In a further aspect, a circuit as defined in claim 17 is provided. In yet another aspect, a method as defined in claim 21 is provided. The dependent claims define further embodiments. Features defined in one or more claims of one of the aspects may also be applicable to other aspects.

DETAILED DESCRIPTION

Figure 1:
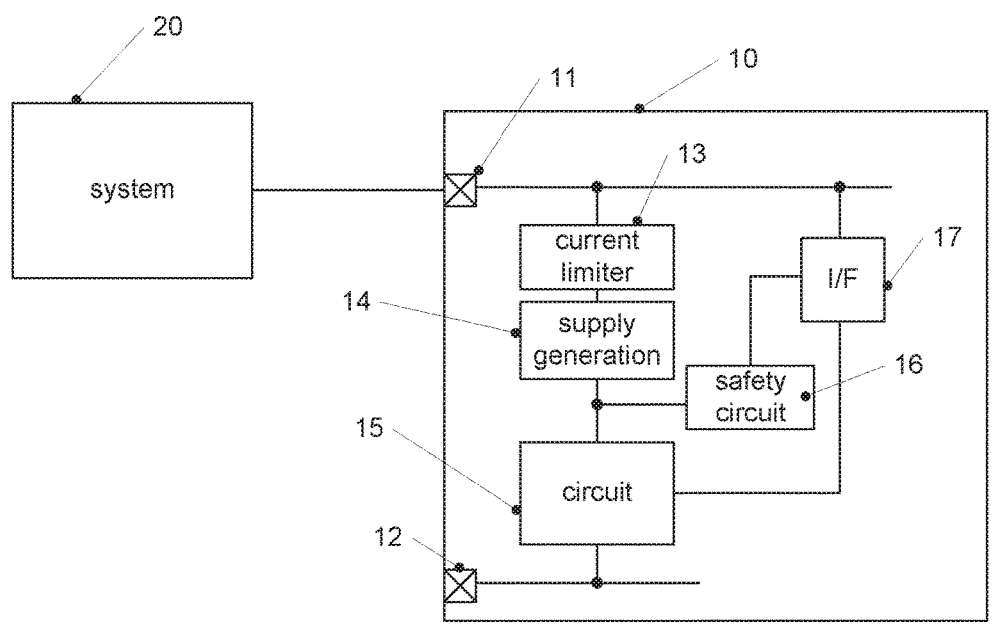
FIG. 1 is a block diagram illustrating a device according to an embodiment.

In the following, various embodiments will be described in detail referring to the attached drawings. These embodiments serve illustrative purposes only and are not to be construed as limiting the scope of the present application.

For example, while an embodiment may be described as comprising a plurality of features or elements, this is by way of illustration only, and other embodiments may comprise less features or elements and/or alternative features or elements. In yet other embodiments, additionally or alternatively further features or elements may be provided. Features from different embodiments may be combined to form further embodiments. Also, a variation or modification described with respect to one of the embodiments may also be applicable to other embodiments unless noted otherwise.

Various elements shown in the drawings are not necessarily to scale with each other, and the spatial arrangement of the various elements and various implementations may be different to the spatial arrangement shown in the drawings. Elements shown in the drawings may be replaced by other elements performing essentially the same function without departing from the scope of the present application.

Any electrical connections or couplings between elements shown in the drawings or described herein may be direct connections or couplings, i.e. connections or couplings without additional intervening elements (for example simple wires or metal layers), but may also be indirect connections or couplings with one or more additional intervening elements, as long as the general purpose of the connection or coupling, for example to transmit a certain kind of signal, voltage, current and/or information, is essentially maintained.

Terminology used herein may correspond to terminology as used in International Standard ISO 26262 related to functional safety for road vehicles. For example, the term error may refer to any discrepancy between a computed, observed or measured value or condition and the true, specified or theoretically correct value or condition. In the present application, an error may for example be present when a voltage is below a specified voltage range. An error may for example be due to a fault.

A fault may refer to an abnormal condition that can cause an element or an item (e.g. a sensor) to fail. A failure may refer to a termination of the ability of an element to perform a function as required.

A safe state may refer to an operating mode of an item without an unreasonable level of risk. Examples may include a normal operating mode, a degraded operating mode or a switched-off mode. It may be required that upon detection of a fault an entity (e.g. item, system etc.) transitions to a safe state within a fault tolerant time interval.

In some embodiments, a supply circuit may comprise one or more supply generation circuits, e.g. voltage converters, to generate one or more internal supply voltages based on an external supply voltage. Furthermore, an interface circuit coupled to an external supply voltage terminal may be provided. The interface circuit may be disabled upon detection of an undervoltage or other voltage deviation in the one or more internal supply voltages. A current limiter arrangement may be provided operably coupled to the supply generation circuits. The current limiter arrangement in some embodiments may limit a current through the supply generation circuits to a predefined value, for example a predefined reset value.

The one or more supply generation circuits may for example comprise voltage converters like DC/DC converters. The interface circuit may be adapted to provide various current levels through the supply voltage terminal.

Turning now to the figures, in FIG. 1 a device 10 according to an embodiment is illustrated. Device 10 may be implemented on a single chip (e.g. chip die), possibly together with further circuit parts, but may also be implemented using several chips and/or discrete elements. In some embodiments, device 10 may be a sensor device, for example an acceleration sensor, a pressure sensor or a magnetic field sensor, but is not limited thereto. In some embodiments, device 10 may be used in safety-relevant applications. In some embodiments, device 10 may be used in automotive applications.

Device 10 comprises a first terminal 11 and a second terminal 12. In some implementations, first terminal 11 may be a terminal for receiving an external positive supply voltage, and second terminal 12 may be a ground terminal. Furthermore, first terminal 11 may be used by device 10 to provide a current signal, for example by drawing a predefined current. For example, to transmit digital signals in an implementation a current of 7 mA may correspond to a value of logical 0, and a current of 14 mA may correspond to a value of logical 1, although this is only an example and other values may be used as well. It should be noted that while in the embodiment of FIG. 1 second terminal 12 is illustrated as being connected only to circuit 15, second terminal 15 may additionally be coupled with other elements of FIG. 1, for example current limiter 13, supply generation circuit 14, undervoltage detection circuit 16 and/or interface circuit 17.

In FIG. 1, a supply generation circuit 14, comprising for example a voltage converter like a DC/DC converter, is coupled to first terminal 11. Supply generation circuit 14 is configured to generate an internal supply voltage for a circuit 15 based on an external supply voltage received at terminal 11. For example, supply generation circuit 14 may comprise any conventional type of voltage converter like a switched mode power supply (SMPS), for example comprising a buck converter, a boost converter and/or a buck/boost converter. Other kinds of converters, for example transformers, may also be used. Circuit 15 may be any kind of circuit to be supplied by the supply generation circuit 14 and implementing a functionality of device 10. For example, in case device 10 is a sensor device, circuit 15 may for example comprise a sensor circuit. For example, in this case circuit 15 may comprise Hall sensing elements or magnetoresistive sensing elements in the case of a magnetic field sensor or a microelectromechanical system (MEMS) in the case of an acceleration sensor or pressure sensor. These, however, are merely examples, and circuit 15 is not limited to any particular kind of circuit.

Circuit 15 may use an interface circuit 17 to provide a desired current level through first terminal 11. For example, in some embodiments a stand-by current consumption of circuit 15 may be 3.5 mA. To output a current level of 7 mA corresponding to logical 0, circuit 15 may draw an additional 3.5 mA via interface circuit 17, and to provide a current level of 14 mA corresponding to logical 1, circuit 15 may draw another 10.5 mA via interface circuit 17. These values serve only as examples, and other current levels may also be used. In other embodiments, instead of current-based signaling voltage-based signaling may be used, and interface circuit 17 may be configured to provide a desired voltage level at first terminal 11.

In some embodiments, besides current levels for logical 0 and logical 1, a further predefined current level may be provided as a reset level. The reset level may for example indicate a state where device 10 is deactivated and/or has encountered an error. It will be appreciated that a deactivation may be caused in response to the encountered error or as a safety measure in circumstances where the error indicates the circuit is no longer working with sufficient reliability, for example where the error indicates a fault, failure or possible fault or failure of the circuit. In some embodiments, this predefined further current level may correspond to the above-mentioned stand-by current consumption of circuit 15 via supply generation circuit 14, for example 3.5 mA.

The device 10 of FIG. 1 may further comprise a safety circuit 16 monitoring an output voltage of supply generation circuit 14. For example, safety circuit 16 may comprise an undervoltage detection circuit 16 which is configured to detect when a voltage output by supply generation circuit 14 falls below a predetermined threshold. For example, undervoltage detection circuit 16 may be implemented based on a simple comparator or based on a window comparator, but is not limited thereto. In case safety circuit 16 detects an error in the output voltage of supply generation circuit 14 (for example in case an undervoltage is detected), in the embodiment of FIG. 1 safety circuit 16 may disable interface 17.

In some embodiments, for example in a fault-free state only the stand-by current is drawn by circuit 15, which as explained previously may correspond to a predefined reset level. Therefore, by detecting a current corresponding to the reset level, an external system 18 may be informed of the reset state, in this case for example the disabled state of interface 17. In automotive applications the system 18 could be implemented as an electronic control unit (ECU).

However, some faults causing an error to be detected by safety circuit 16, for example an undervoltage, may also influence the current drawn by circuit 15. As an example, faults causing a detection of an undervoltage may include a short circuit fault, which would cause circuit 15 to draw additional current without further measures. Short circuits may for example be caused by so-called random hardware failures. The additional current could change the current sensed through first terminal 11 by system 20, such that system 18 may not recognize the reset state correctly, as the current level is higher than the predefined error state current.

To prevent such a misinterpretation of a current level, in the embodiment of FIG. 1 a current limiter 13 is provided operably coupled to supply generation circuit 14. Current limiter 13 may comprise any conventional current limiting circuit, for example based on a resistor or a current mirror. Current limiter 13 may be configured to limit the current through a section of the supply circuit. Typically the section of the supply circuit is coupled to the current limiter and the current limiter 13 is configured to limit a current flow through the section. In the embodiment of FIG. 1 the supply generation circuit 14 corresponds to the section through which the current flow is limited to a predefined level. The predefined level may correspond to the predefined stand-by current or reset level mentioned above. When in such a configuration with a current limiter as shown in FIG. 1 a fault like a short circuit condition occurs, still only the predefined level of current is drawn (as it is limited by current limiter 13) via supply generation circuit 14. In this way, by providing current limiter 13, in some embodiments it may be ensured that a predefined reset current level is output also in case of short circuit failures or other errors which influence the current consumption of circuit 15. Therefore, system 18 may e.g. recognize a reset state correctly by sensing the predefined current. This may be important to fulfill safety requirements, e.g. as defined in ISO 26262. For example, as explained above when a fault occurs, a system or other entity may be required to transition to a safe state. To initiate such a transition, it may be required that the system is informed of the fault. By providing the current limiter, in embodiments reliable communication of the reset state (e.g. due to an error, which may be caused by a fault) to the system is ensured, and the system can then take appropriate measures, e.g. to transition to a reset state.

It should be noted that in some embodiments current limiter 13 may also cause undervoltage detection circuit 16 to react faster in case of a short circuit and similar errors. As mentioned, errors like undervoltage errors could without the presence of current limiter 13 increase the current consumption of circuit 15. Supply generation circuit 14 may then try to meet this required additional current consumption, which, however, is limited by current limiter 13. This may cause a voltage generated by supply generation circuit 14 to break down faster than in a case without current limiter 13, which in turn may cause a faster detection by safety circuit 16. In some embodiments, this may then lead to a faster deactivation of interface circuit 17 and/or a faster presence of the predetermined error current level at first terminal 11. Therefore, a failure may be detected faster than without current limiter 13 in some embodiments.

It should be noted that in the embodiment of FIG. 1 interface 17 serves only as an example for a circuit or circuit part to be disabled in case a safety circuit like circuit 16 detects an error. Generally, in embodiments, upon detection of an error one part (e.g. 17) of a circuit coupled to a terminal (e.g. 11) may be disabled, and a current limiter may limit a current drawn by the other part of the circuit (e.g. 14, 15, 16) to a predefined current value to ensure reliable communication of an error, fault and/or failure. In other embodiments, no disabling of a circuit part may be performed, and the current limiter may still limit the total current drawn to ensure reliable communication of an error, fault and/or failure.

While a single supply generation circuit 14 is shown in FIG. 1, in other embodiments more than one supply generation circuit may be provided, for example to provide different supply voltages or separate supply voltages for different sections or portions of circuit 15. Examples will be illustrated next with reference to FIGS. 2 and 3.

Figure 2:
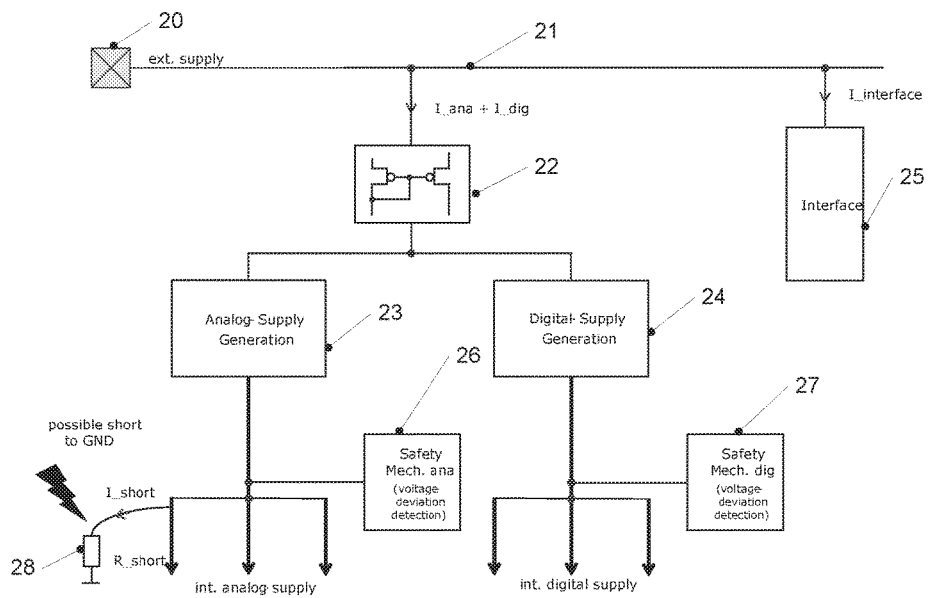
FIG. 2 is a block diagram illustrating a supply circuit according to an embodiment.

In FIG. 2 a supply circuit is illustrated which receives an external supply voltage via a terminal 20. In some embodiments, terminal 20 may correspond to first terminal 11 of FIG. 1. The external supply voltage for example may be a positive supply voltage. Via terminal 20, the external supply voltage is then provided to a supply voltage line 21. An interface circuit 25 may draw a current I_interface from supply voltage line 21. A function of interface circuit 25 may correspond to a function of interface circuit 17 of FIG. 1. In particular, interface circuit 17 may provide different current levels through terminal 20. These different current levels may correspond to different logical levels (e.g. logical 0 or logical 1) that may be used for signaling.

Furthermore, the external supply voltage on supply voltage line 21 may be converted to an internal analog supply voltage by an analog supply generation circuit 23 and/or to an internal digital supply voltage by a digital supply generation circuit 24. The internal analog supply voltage may be used to supply analog parts of a circuit like circuit 15 of FIG. 1, and the internal digital supply voltage may be used to supply digital parts of such a circuit. In other embodiments, more than two different supply voltages may be generated. Analog supply generation circuit 23 and digital supply generation circuit 24 each may comprise a voltage converter like a DC/DC converter to convert the external supply voltage to a desired internal supply voltage. Circuits 23 and 24 may be implemented using any conventional voltage conversion techniques, for example those already mentioned with respect to FIG. 1.

Furthermore, an analog safety circuit 26 is coupled to an output of analog supply generation circuit 23. Safety circuit 26 may detect voltage deviations, for example an undervoltage (e.g. a voltage below a predetermined threshold) or an overvoltage (e.g. a voltage above a further predetermined threshold), and may deactivate interface circuit 25 upon detection of a voltage deviation condition, for example an undervoltage and/or an overvoltage of the internal analog supply voltage. Furthermore, a digital safety mechanism circuit 27 may be provided (optionally implemented as a digital circuit) monitoring an output voltage of digital supply generation circuit 24 to detect a voltage deviation like an undervoltage or an overvoltage. It should be noted that providing a digital safety mechanism circuit monitoring the output of digital supply generation circuit 24 may be of particular importance as generally, safety features may be comparatively easy to implement in digital circuit portions by programming or designing elements like digital signal processors accordingly, compared to implementations in analog circuit portions. However, providing a correct supply voltage may still be crucial, as without such a correct supply voltage the complete digital circuit portion may fail.

Upon detection of such a voltage deviation, digital safety mechanism circuit 27 may deactivate interface 25. Safety mechanism circuits 26, 27 may for example be implemented using comparators. In some embodiments, disabling interface 25 may imply that after disabling interface 25 essentially does not draw current from terminal 20. In some embodiments, deactivating interface 25 may serve to signal an error (e.g. the voltage deviation) to a system coupled to terminal 20. In other embodiments, additionally or alternatively to disabling interface 25 other measures may be taken. Examples include disabling one or more circuits portions coupled to terminal 20 (e.g. including circuit portions shown in FIG. 2) or communicating an error to an external entity, e.g. a system, via other means than terminal 20 (e.g. via other terminals or lines). Other examples include using correction mechanisms to correct output current values output e.g. at terminal 20, e.g. using override/default values, or implementing other mechanisms that may compensate the voltage deviation.

A current drawn by circuit portions supplied by analog supply generation circuit 23 is labeled I_ana in FIG. 2, and a current drawn by circuit portions supplied by digital supply generation circuit 24 is labeled I_dig. Therefore, in the embodiment of FIG. 2 a current drawn via terminal 20 corresponds to I_ana+I_dig+I_interface. The current I_ana+I_dig may also be referred to a "standby current" and corresponds to a current that is drawn when I_interface is zero, e.g. when interface 25 is disabled. During normal operation, the current I_ana+I_dig may correspond to a predefined reset level indicating that a device supplied by the supply circuit illustrated in FIG. 2 is inactive or in an error state. To provide other signal levels, corresponding currents I_interface are added to the current I_ana+I_dig. For example, the predefined reset current may be 3.5 mA, and I_interface may add either 3.5 mA or 10.5 mA for total levels of 7 mA (for example corresponding to logic low) and 14 mA (for example corresponding to logic high). Such current levels are for example used in some automotive applications. However, these numerical values are merely examples, and other current levels may be used in other implementations.

As explained previously with respect to FIG. 1, errors like random hardware failures may for example cause a short circuit condition to appear. As an example, in FIG. 2 a short circuit to ground via a resistor 28 is illustrated. This leads to an additional current I_short depending on the resistance R_short of resistor 28 (which in turn depends on where the error occurs and in which manner). Without further measures, the current I_short would add to the overall current, to result in a total current I_ana+I_dig+I_short. Furthermore, such a short circuit may lead to a breakdown of a voltage generated by analog supply generation circuit 23, which may be detected by analog safety mechanism circuit 26 leading to a deactivation of interface 25. However, without further measures in this case a current could be drawn by the circuit which exceeds the above-mentioned predefined reset level by the current I_short. This in turn may cause a system coupled to terminal 20 not to recognize the reset condition correctly. In fact in case of a short failure any predefined current level may no longer be correctly recognized due to the additional current I_short.

To prevent incorrect recognition of predefined current levels, in the embodiment of FIG. 2 a current limiter 22 is provided coupled between voltage line 21 and supply generation circuits 23, 24 as shown. Current limiter 22 for example may be implemented using a current mirror or a resistor, but is not limited thereto. Current limiter 22 may be designed to limit the current I_ana+I_dig to a predetermined current level, for example the above-mentioned predetermined reset level. This predetermined current level may correspond for example to a stand-by current consumption. With current limiter 22, even when a short circuit as illustrated in FIG. 2 occurs, the predetermined current level is provided at terminal 20, and therefore the reset condition (for example indicating an error) may be recognized e.g. by an external system. In other words, provision of the current limiter 22 provides the reset condition (e.g. predefined reset current) as communicable to an external system coupled to the supply circuit of FIG. 2 via terminal 20, in particular also in case of short failures or other failures increasing the current drawn via terminal 20.

Moreover, provision of current limiter 22 may improve the detection of undervoltage conditions by safety mechanism circuits 26, 27, as was explained for undervoltage detection circuit 16 of FIG. 1.

In the example supply circuit of FIG. 2, current limiter 22 is arranged between terminal 20 and supply generation circuits 23, 24. In other embodiments, instead of a common current limiter 22 as shown in FIG. 2 acting on both supply generation circuits 23, 24, individual current limiters may be associated with the supply generation circuits 23, 24. In some embodiments, a sum of the individual current limits imposed by the individual current limiters may then correspond to a predetermined current level, for example a reset level. Such individual current limiters may be provided between terminal 20 and supply generation circuits 23, 24 or also at an output of supply generation circuits 23, 24. A corresponding example embodiment is illustrated in FIG. 3.

Figure 3:
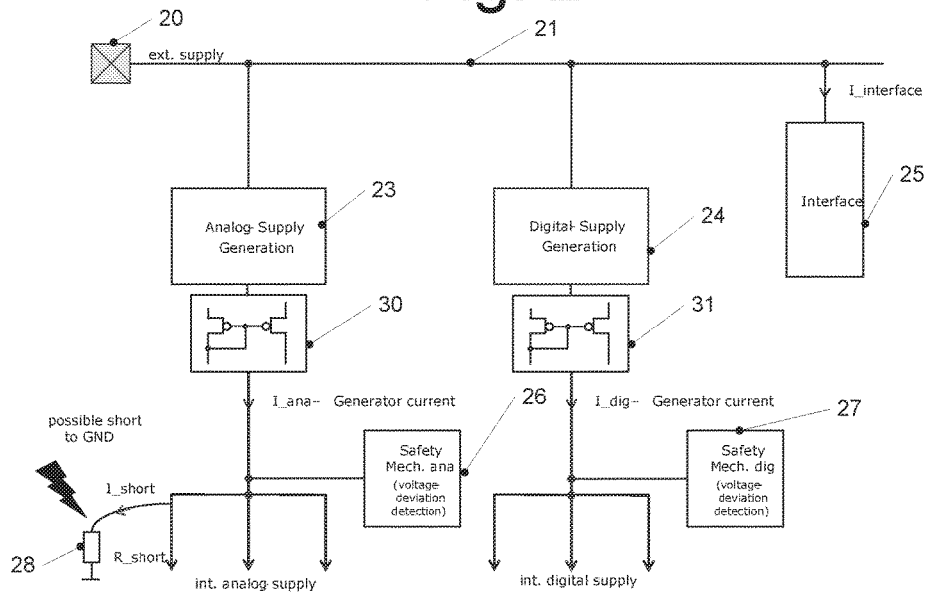
FIG. 3 is a block diagram illustrating a supply circuit according to a further embodiment.

In the embodiment of FIG. 3, elements and components also present in the embodiment of FIG. 2 bear the same reference numerals and will not be described again in detail. Instead, to provide a concise description only differences between the embodiments of FIGS. 2 and 3 will be discussed in detail. Variations and modifications discussed with reference to FIG. 2 are also applicable to the embodiment of FIG. 3.

Compared to the embodiment of FIG. 2, in the embodiment of FIG. 3 current limiter 22 is omitted, and current limiters 30, 31 are provided. Current limiter 30 is associated with analog supply generation circuit 23, and current limiter 31 is associated with digital supply generation circuit 24. In FIG. 3, current limiters 30, 31 are provided on an output side of supply generation circuits 23, 24. In cases where an external supply voltage provided at terminal 20 is higher than the internal supply voltages provided by supply generation circuits 23, 24, this means that current limiters 30, 31 are placed on a low voltage side. In such an embodiment, circuit components designed for a corresponding lower voltage may be used to implement current limiters 30, 31, which may for example lead to an area saving and/or facilitate implementation. In other embodiments, current limiters 30, 31 may be provided between terminal 20 and supply generation circuits 23, 24. Current limiters 30, 31 may be implemented as discussed above, for example using current mirrors or resistors. In the embodiment of FIG. 3, a sum of a current limit of current limiter 30 and a current limit of current limiter 31 may correspond to a predefined current level, for example a reset level or other level used to indicate an error condition and/or a reset condition. Providing the respective current limits to meet the error or reset current level will render the error or reset state communicable to the external system as explained above, e.g. with respect to FIG. 2.

Therefore, in embodiments generally a current limiter arrangement may be provided, which may comprise one current limiter as shown in FIG. 1 or 2 or a plurality of current limiters as shown in FIG. 3, and an overall current limit of the current limiter arrangement may for example correspond to a predefined current level like a reset current level, and/or may correspond to a stand-by power consumption of a circuit to be supplied via one or more supply generation circuits.

Figure 4:
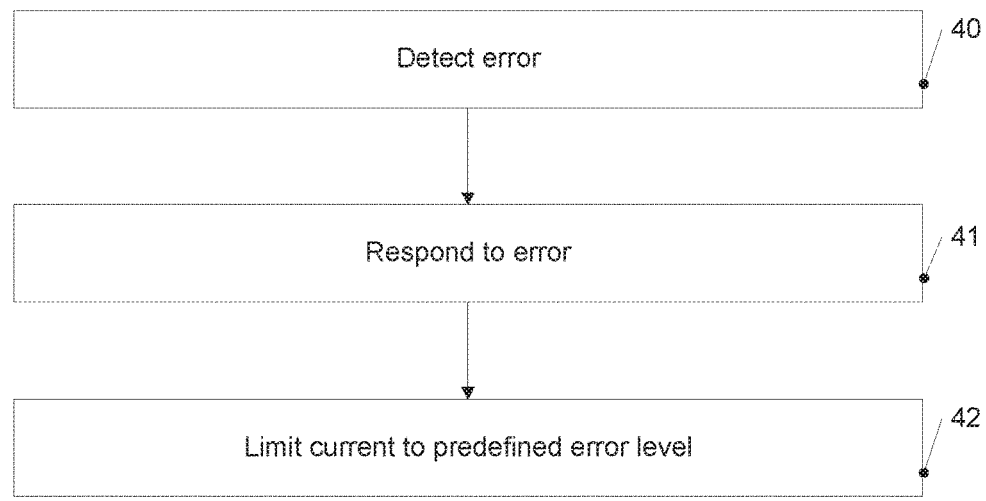
FIG. 4 is a flowchart illustrating a method according to an embodiment.

In FIG. 4, a method of operating a current supply circuit according to an embodiment is illustrated. The method may be implemented using devices and circuits as discussed with reference to FIGS. 1 to 3, but may also be implemented using other devices and circuits. While the method of FIG. 4 is illustrated and will be described as a series of acts or events, the order in which these acts or events are described is not to be construed as limiting, and other orders, including parallel occurrences of acts or events, are also possible.

At 40, an error at a supply generation circuit, for example a DC/DC converter, is detected. For example, at 40 the method may comprise detecting an undervoltage at an output of the supply generation circuit.

At 41, a response measure in response to detecting the error is performed. For example, in an embodiment a current interface may be disabled. In normal operation, the current interface may be used to provide desired current levels at an external supply voltage terminal, for example to transmit data.

In other embodiments, additionally or alternatively to disabling the current interface other measures may be taken. Examples for such other measures include disabling one or more circuit portions or communicating an error to an external entity, e.g. a system. Other examples include using correction mechanisms to correct e.g. current values being output, e.g. using override/default values, or implementing other mechanisms that may compensate or mitigate the error.

At 42, in the error condition a current is limited to a predefined error level (also referred to as reset level), e.g. 3.5 mA, which may be used for signaling the error condition to an external system. Other techniques may also be employed.

The above-described embodiments serve merely as examples, and other implementations are also possible.

The invention claimed is:

1. A supply circuit, comprising:
   a supply terminal configured to receive an external supply voltage;
   at least one supply generation circuit configured to generate at least one internal supply voltage based on the external supply voltage;
   a voltage deviation detection circuit configured to detect a deviation of the at least one internal supply voltage from a predefined voltage range; and
   a current limiter arrangement configured to limit a current through the at least one supply generation circuit, which would otherwise exceed a predefined current value, to the predefined current value to enable an external system to identify an error state via identification of the predefined current value upon the deviation of the at least one internal supply voltage from the predefined voltage range.

2. The supply circuit of claim 1, further comprising:
   a current interface circuit coupled to the supply terminal, the current interface circuit being configured to provide an adjustable current through the supply terminal.

3. The supply circuit of claim 2, wherein the voltage deviation detection circuit is configured to disable the current interface circuit upon detection of a voltage deviation.

4. The supply circuit of claim 1, wherein the voltage deviation detection circuit comprises an undervoltage detection circuit configured to detect when a voltage falls below a predetermined voltage threshold.

5. The supply circuit of claim 1, wherein the voltage deviation detection circuit comprises a comparator.

6. The supply circuit of claim 1, wherein the current limiter arrangement is provided between the supply terminal and the at least one supply generation circuit.

7. The supply circuit of claim 1, wherein the current limiter arrangement is provided on a low voltage side of the at least one supply generation circuit.

8. The supply circuit of claim 1, wherein the at least one supply generation circuit comprises a plurality of supply generation circuits to provide a respective plurality of internal supply voltages.

9. The supply circuit of claim 8, wherein the at least one supply generation circuit is configured to provide a supply voltage for a digital domain.

10. The supply circuit of claim 8, wherein the current limiter arrangement comprises a single current limiter circuit for the plurality of supply generation circuits.

11. The supply circuit of claim 8, wherein the current limiter arrangement comprises a plurality of current limiter circuits, each of the plurality of current limiter circuits being associated with at least one of the plurality of supply generation circuits.

12. The supply circuit of claim 1, further comprising:
   a further circuit, coupled to the at least one supply generation circuit, the further circuit to be supplied by the at least one internal supply voltage.

13. The supply circuit of claim 12, wherein the further circuit comprises a sensor circuit.

14. The supply circuit of claim 12, further comprising:
   a current interface circuit coupled to the supply terminal, and
   wherein the further circuit is configured to communicate with an external entity via the supply terminal by drawing predefined current levels via the current interface circuit.

15. The supply circuit of claim 12, wherein the predefined current value of the current limiter arrangement corresponds to a stand-by current consumption of the further circuit.

16. The supply circuit of claim 1, wherein the current through the at least one supply generation circuit exceeding the predefined current value in an absence of the current limiter arrangement prevents the external system from identifying the error state upon the deviation of the at least one internal supply voltage from the predefined voltage range.

17. The supply circuit of claim 1, wherein the error state is associated with a short circuit fault that results in the current through the at least one supply generation circuit exceeding the predefined current value in an absence of the current limiter arrangement.

18. A circuit, comprising:
   a supply terminal configured to receive an first supply voltage,
   a safety mechanism circuit configured to detect an error associated with a deviation of the first supply voltage, and
   a current limiter arrangement configured to limit a current drawn through the supply terminal, which would otherwise exceed a predefined current value, to the predefined current value when the safety mechanism circuit detects the error to enable an external system to identify the error via identification of the predefined current value upon the deviation of the first supply voltage.

19. The circuit of claim 18, further comprising:
   a first circuit portion coupled to the supply terminal; and
   a second circuit portion coupled to the supply terminal,
   wherein the safety mechanism circuit is configured to disable the first circuit portion when the safety mechanism detects an error, and
   wherein the current limiter arrangement is configured to limit a current drawn through the supply terminal by the second circuit portion.

20. The circuit of claim 19, wherein the first circuit portion comprises a current interface.

21. The circuit of claim 18, wherein the safety mechanism circuit is configured to detect an error in a second supply voltage, the second supply voltage being based on the first supply voltage.

22. A method, comprising:
   detecting an error associated with a deviation of an internal supply voltage,
   responding to the error, and
   limiting a current drawn through a supply terminal, which would otherwise exceed a predefined error current level, to the predefined error current level to allow an external system to identify the error via identification of the predefined current value upon the deviation of the internal supply voltage,
   wherein the supply terminal is configured to receive an external supply voltage.

23. The method of claim 22, wherein the predefined error current level is 3.5 milliamps (mA).

24. The method of claim 22, wherein detecting the error comprises detecting an undervoltage if the internal supply voltage falls below a predetermined voltage threshold.

25. The method of claim 22,
   wherein the responding to the error comprises disabling a part of a circuit coupled to the supply terminal, and
   wherein the limiting the current drawn through the supply terminal comprises limiting a current drawn by another, non-disabled part of the circuit.

26. The method of claim 25, wherein the disabled part of the circuit comprises a current interface.

* * * * *